July 21, 1964     K. C. ALLEN ETAL     3,141,514
RECORDING SCALE

Original Filed Jan. 25, 1956     5 Sheets-Sheet 1

INVENTORS
KENNETH C. ALLEN &
DAVID A. MEEKER
BY
ATTORNEYS

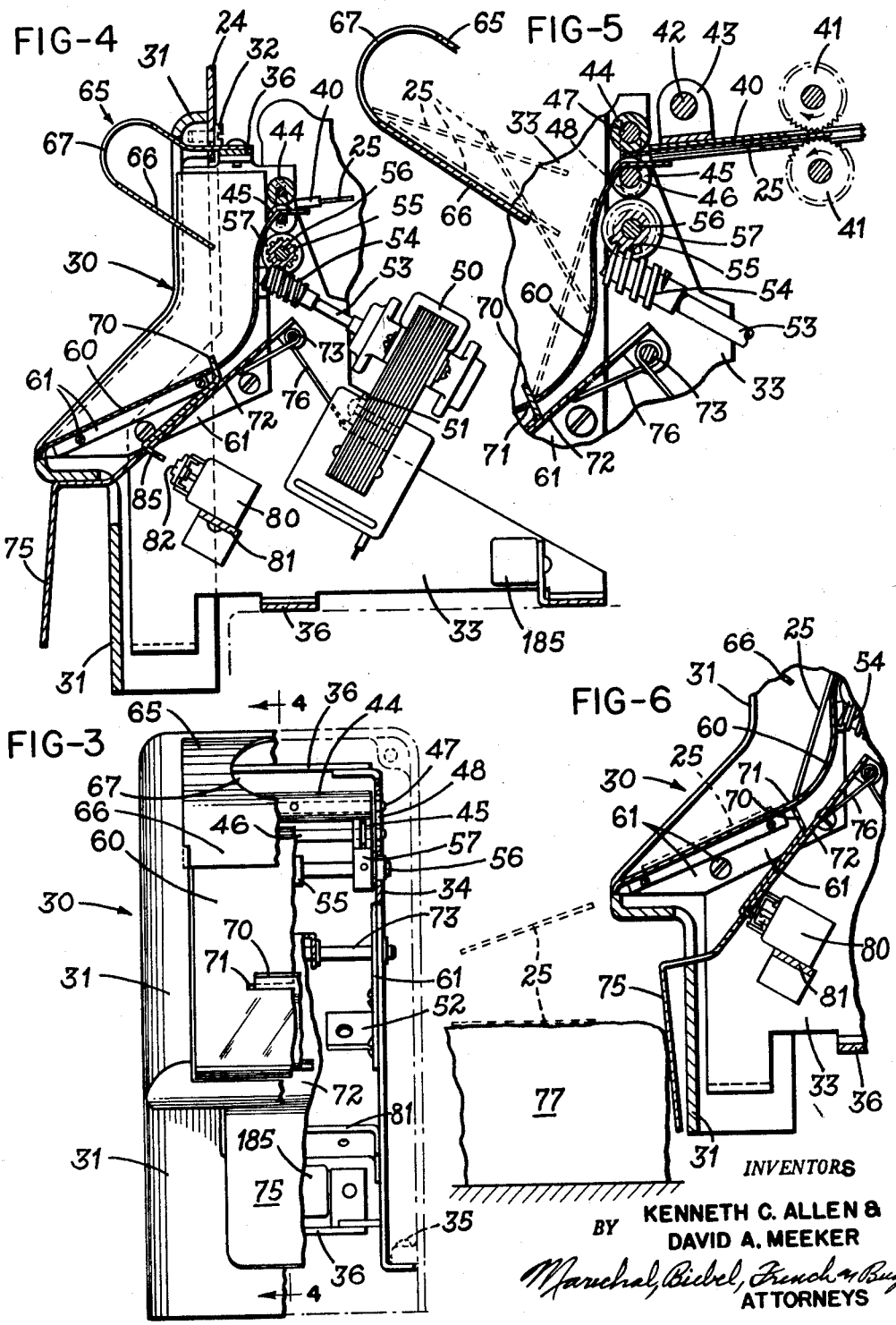

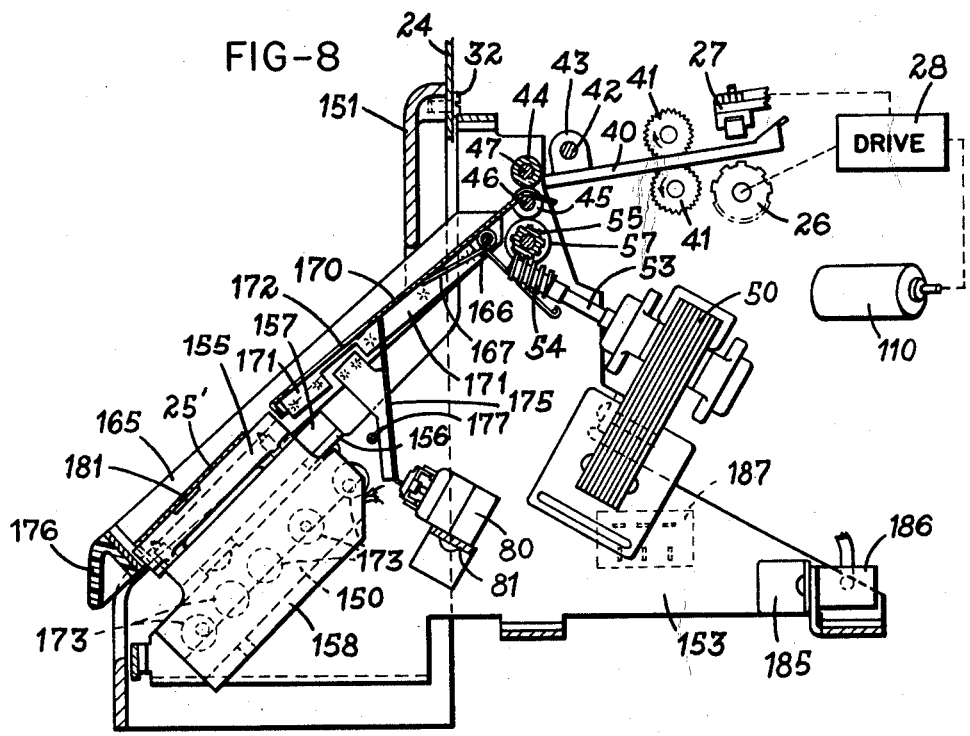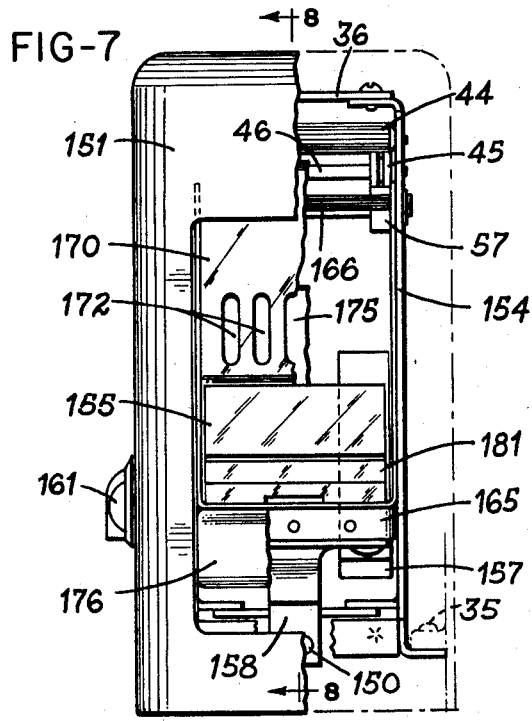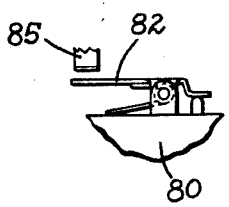

July 21, 1964 K. C. ALLEN ETAL 3,141,514
RECORDING SCALE

Original Filed Jan. 25, 1956 5 Sheets-Sheet 4

INVENTORS
KENNETH C. ALLEN &
BY DAVID A. MEEKER

ATTORNEYS

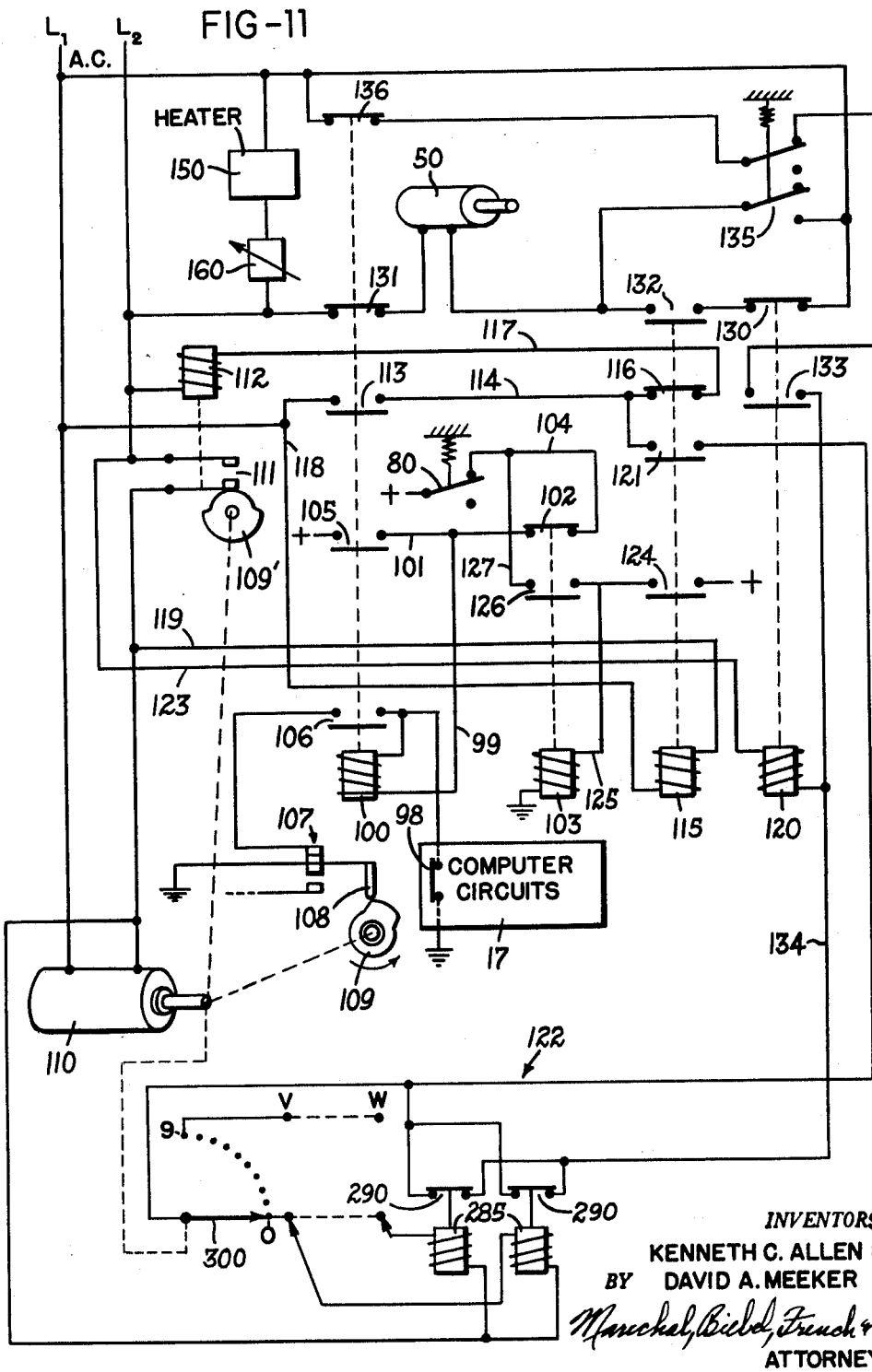

United States Patent Office 3,141,514
Patented July 21, 1964

3,141,514
RECORDING SCALE
Kenneth C. Allen, Dayton, and David A. Meeker, Troy, Ohio, assignors to The Hobart Manufacturing Company, Troy, Ohio, a corporation of Ohio
Original application Jan. 25, 1956, Ser. No. 561,336, now Patent No. 2,948,466, dated Aug. 9, 1960. Divided and this application Aug. 1, 1960, Ser. No. 46,408
3 Claims. (Cl. 177—3)

This invention relates to apparatus for the handling of printed tickets such particularly as successive labels or the like.

The invention has special applicability to use in a weighing system incorporating a weighing mechanism together with apparatus for computing the value of successive weighed articles and for issuing printed tickets identifying the weight and the unit price and value of the articles. For example, the invention is described hereinafter in conjunction with a weighing system for use by a food store in prepackaging operations wherein a series of successive packages or articles of food commodities are weighed and then labeled with a printed ticket identifying the commodity together with its weight, unit price and value, and such systems are disclosed in a series of copending applications assigned to the same assignee as this application and identified as Cases A to C in accordance with the index table at the end of this specification. In such packaging operations, it is important to provide for maximum speed while still giivng maximum assurance against error at every stage of the operation, to the end that each successive package or other article be properly identified by its own printed label or other ticket and that the information appearing on each such ticket be accurate in every respect.

It is a primary object of the present invention to provide a weighing system of the above type which includes a weighing mechanism having a computer and a printer interconnected therewith for printing and issuing successive printed tickets showing the weight and the unit price and value of successive articles weighed by the mechanism, and which also includes a mechanism associated with the printer which will advance each successive ticket to a delivery station in a desired position for application by the operator to its related package or other article.

Another object of the invention is to provide a weighing system as outlined above wherein the ticket handling mechanism is interconnected with the computer and printer in such manner as to prevent operation of the printer related to a subsequent article until the previously printed ticket has been withdrawn from the delivery station.

An additional object of the invention is to provide a weighing system as outlined above wherein delivery of the printed ticket to the delivery station is prevented if an error has occured in the operation of the printer, and wherein also correction of the error requires manual operation of a reset member and thereby positively indicates to the operator that the ticket resulting from such improper operation is defective and should not be used.

A further object of the invention is to provide a ticket handling mechanism which is adapted for use as outlined above with a printer constructed to issue successive tickets face-down, and which includes provision for turning each successive ticket face-up in the course of advancing the ticket to the delivery station for ready application to a package to be subsequently wrapped in a separate wrapper.

It is also an object of the invention to provide a ticket handling mechanism which is adapted for use with tickets having a heat sensitive adhesive on the back thereof and which incorporates a heater for activating the adhesive under such conditions at the delivery station that the ticket may be directly applied to the package or other article without handling by the operator.

Other objects and advantages of the invention will be apparent from the following description, the accompanying drawings and the appended claims.

In the drawings—

FIG. 3 is a view looking at the front of the ticket handling mechanism in FIG. 1 with portions of the right hand side of the view being removed or broken away;

FIG. 4 is a section on the line 4—4 of FIG. 3;

FIG. 5 is an enlarged fragment of FIG. 4 illustrating the operation of the mechanism;

FIG. 6 is another enlarged fragment of FIG. 4 further illustrating the operation of the mechanism;

FIG. 7 is a view similar to FIG. 3 showing the form of the mechanism of the invention for handling tickets having a heat sensitive adhesive coating;

FIG. 8 is a section on the line 8—8 of FIG. 7;

FIG. 10 is a fragmentary view illustrating an operating detail of both the mechanisms of FIGS. 1–9;

FIG. 11 is a wiring diagram; and

Figures 1, 2:
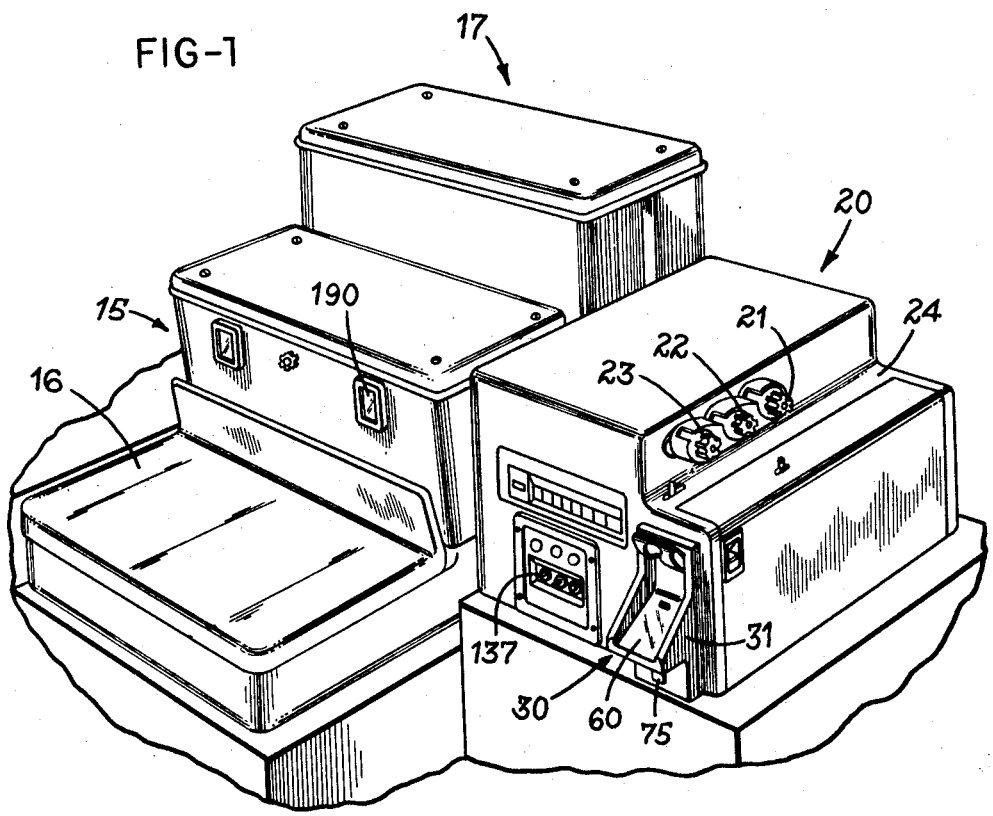
FIG. 1 is a perspective view showing a complete weighing system incorporating a ticket handling mechanism in accordance with the invention and including a weighing scale, a computer actuated by the scale, and a printer for printing and issuing printed tickets identifying the weighed commodity and also showing the weight and the unit price and value of each successive load weighed on the scale.
FIG. 2 illustrates a printed ticket of the type supplied by the apparatus of FIG. 1.

Referring to the drawings, which illustrate preferred embodiments of the invention, the complete weighing system of FIG. 1 includes a power operated scale 15 having a platter 16 which receives the package or other article to be weighed, and an example of a satisfactory power operated scale is disclosed in the copending Case A. The weighing operation of the weighing mechanism of scale 15 is transmitted to a computing apparatus 17 which registers the total weight in terms of pounds and suitable fractions of a pound, and which also computes the value of the load in accordance with a preset price per pound, an example of a suitable such computer being disclosed in detail in the copending Case B. The scale 15 and computer 17 are in turn interconnected with a printing apparatus 20 which is constructed for cooperation with the scale and computer to print and issue successive printed tickets showing the weight and the unit price and value of each load weighed by the scale.

The nature of the particular printer and of the ticket or label which it issues is not material to the present invention, but by way of illustrative example, the printer 20 is shown and referred to herein as constructed in accordance with the disclosure of the copending Case C. This printer is provided with manual control knobs 21, 22 and 23 which correspond to dollars, dimes and cents per pound and are mounted on the outside of the printer casing 24 for presetting the unit price of the commodity being weighed. An example of a ticket produced by this printer 20 is shown at 25 in FIG. 2, and the means for printing the weight, price and value designations on each ticket are indicated diagrammatically in FIG. 8 as including a plurality of printing wheels 26 and a cooperating impression hammer 27 operated by the drive of the printer which is represented diagrammatically at 28 and which may, for example, be of the construction shown in Robertson Patent No. 2,056,486.

The present invention provides a mechanism which is identified generally at 30 in FIG. 1 and which functions to receive each successive ticket issued by the printer 20 and to deliver such ticket to a delivery station in a manner offering maximum aid to the operator in achieving speed and accuracy in the application of such tickets to the successive weighed packages. For example, the form of the invention shown in FIG. 1 and FIGS. 3-6 is intended for use in conjunction with the weighing and packaging of a food commodity such as ground meat which it is customary to package in a transparent wrapper with the identifying ticket contained within the wrapper. The mechanism 30 is especially adapted for cooperation with a printer arranged to issue the successive printed tickets with the printed face down, such as the mechanism shown in FIG. 8 and in Case C, and the mechanism 30 accordingly includes means for turning the ticket to a face-up position at its delivery station to facilitate its application to the package. The details of this mechanism are best seen in FIGS. 3-6.

The mechanism 30 includes a front housing 31 adapted to be directly secured to the printer housing 24 as by means of the screws 32. Within the housing is a frame which includes left and right side plates 33 and 34 secured to the housing as by the screwed connections indicated at 35 and connected together by straps 36 or the like. The side plates 33 and 34 project rearwardly from the housing 30 and are adapted to extend into the lower portion of the interior of the printer housing where they underlie the front end of the guide chute 40 through which the successively printed tickets 25 are issued by the ejector wheels 41 of the printer with the printed face of each ticket being down. The parts 42 and 43 mounted on the guide chute 40 are associated with mechanism for printing the commoditiy designation on each ticket as shown in Case C and otherwise form no part of the present invention.

The side frames 33 and 34 support a pair of superimposed feed rolls 44 and 45 having their nip located to reieve a printed ticket issuing from the chute 40. As best shown in FIG. 3, the upper roll 44 extends substantially the full distance between the side frames, and satisfactory results have been obtained with this roll formed of metal such as brass. The lower feed roll engages the freshly printed surface of each ticket, and it is therefore shown as a pair of rubber spaced rollers 45 adjacent opposite ends of shaft 46 to engage only the unprinted side edges of the ticket. The ends of the shaft 46 and and also the shaft 47 of roller 44 are received in slots 48 in the side frames permitting vertical movement of the rolls and gravity loading of their nip by the weight of the metal roll 44.

A drive motor is provided for the feed rolls 44 and 45. This motor 50 is mounted on the frame by bolting to a pair of tabs 51 and 52 bent inwardly from the two side plates 33 and 34, and the drive shaft 53 of the motor carries a worm 54 meshing with a worm gear 55 on a shaft 56 journaled in the frame below the roller shaft 46. The shaft 56 carries a small metal roller 57 at each end for frictional engagement with the rubber rollers 45 to provide therethrough a friction drive to the feed rolls 44 and 45.

The driven feed rolls 44 and 45 are therefore located to receive and advance the ticket ejected from the knife chute 40, but this ticket will still be facedown when it emerges from the feed rolls. The invention accordingly provides a guide chute arrangement which turns the ticket over to a face-up position before it reaches the delivery station for use by the operator. Referring particularly to FIGS. 4 and 5, the chute 60 of generally S-shape is secured to the frame by suitable screws and flanges 61. The upper end of this chute projects between the upper feed roll 44 and the shaft 46 for the rubber feed rollers 45 so that the ejected ticket passes out initially above the chute. A guide member 65 is mounted on the frame of chute 60 and includes a curved upper portion and a straight and smoothly surfaced lower portion 66 which projects downwardly at an angle into the path of a ticket 25 emerging from the feed rolls 44 and 45. This guide member also has an opening 67 in its curved upper portion providing for viewing of the feed rolls and manual access thereto.

The operation of this guide chute arrangement is clearly shown in FIG. 5. As a ticket 25 is first advanced by the feed rolls 44–45, its leading edge engages and slides upwardly along the guide surface 66 until the trailing end of the ticket is free of the feed rolls. The upward movement of the ticket then stops, and gravity causes it to slide back down toward the chute 60. Since the guide member overhangs the lower end of the chute it cooperates with the chute to flip the ticket over to a face-up position.

The initial delivery station of the ticket handling mechanism is defined by a stop 70 projecting upwardly through a slot 71 in the chute 60. This stop 70 is a flange extending upwardly from an arm 72 pivoted on a shaft 73 extending between the side plates 33 and 34. The arm 72 terminates in a lever 75 depending at the front of the housing 31, and a torsion spring 76 normally biases the arm in clockwise direction as viewed in FIG. 4 to cause the stop 70 to project into the path of downward movement of the ticket along chute 60.

As shown in FIGS. 5 and 6, the ticket will be held at the delivery station by the stop 70 until the lever 75 is pushed back, which may be done either by the hand of the operator or by pushing this lever with the package to which the particular tickets relate. When the lever 75 is actuated by means of the package itself, as indicated at 77 in FIG. 6, the stop 70 is retracted from chute 60 and thus allows the ticket to slide down the rest of the chute in such manner as to land directly on the package face up and ready to be wrapped therewith. Similarly if the lever 75 is actuated manually, the ticket will be deposited in the hand of the operator for manual application to the package as may be desirable with larger packages such as roasts or the like.

Special provision is made in accordance with the invention for preventing the accumulation of tickets at the discharge station, which might cause application of the wrong ticket to a package, and this result is accomplished by blocking operation of the motor 50 after one ticket has reached the discharge station until the lever 75 has been actuated to retract stop 70 for removal of the ticket. More specifically, the control circuits for the motor 50 are designed to provide for cyclic operation of this motor, as described in detail hereafter in connection with the wiring diagram in FIG. 11, and these circuits include a switch 80 which requires operation after one cycle has been completed before a second cycle can be started. This switch 80 is mounted on the frame of the ticket handling mechanism by means of a bracket 81 in position for actuation of its control arm 82 by a finger 85 projecting below the arm 72, the details of this mechanism being shown in FIG. 10.

The wiring diagram in FIG. 11 illustrates the operation of the ticket handling mechanism of FIGS. 3-6. In addition this wiring diagram includes some portions of the control circuits of the printer 20 in order to illustrate how the controls for the ticket handling mechanism may be interconnected with the printer for the purpose of correlating the operations of all parts of the complete weighing system of FIG. 1. A complete cycle of this weighing system begins when the package or other article is placed on the scale platter 16, the price-per-pound selectors 21–23 having first been adjusted to the proper setting for the commodity being weighed, and the weight factor determined by the weighing mechanism in the scale is supplied to the computer and the printer for computing the value of the package. The printing wheels 26 are automatically set to the proper positions in accordance with the weight and value of the package, and the printer cycle is completed to print and issue the appropriate ticket 25, a complete disclosure of apparatus for carrying out this cycle being found in Case C. The operation of the ticket handling mechanism is correlated with that of the printer to actuate the motor 50 in timed relation with the issue of the ticket by the printer.

The present invention is not limited to use with specific computing and printing mechanism, since it is also applicable, for example, to a ticket printer requiring manual setting from a visually observed weighing and computing mechanism, and the wiring diagram therefore includes only such fragments of parts relating to the computer 17 and printer 20 as are helpful in understanding one way of interconnecting the ticket handling mechanism therewith. Thus the computer circuits are indicated by the block diagram 17 in FIG. 11, and the printing portion of the complete cycle is shown as initiated through the computer by applying a ground through a switch 98 in the circuits 17 to a line 99 leading to the coil of a relay 100 which corresponds to the relay "530" in Case C. The energizing circuit for relay 100 runs from 99 through a line 101, the back contacts 102 of a relay 103, the line 104, and the normally closed switch 80 to the positive side of the power supply. The relay 100 immediately locks itself in through its terminals 105 and 106 and the upper contacts of a switch 107 having a control arm 108 operated by a rotary cam 109 driven by the motor 110 which constitutes the main drive motor of the printer 20, and which corresponds to the printer motor "150" in Case C.

The motor 110 has a starting switch 111 which is operated mechanically in response to the energizing of a solenoid 112. This solenoid 112 is energized immediately upon the closing of relay 100 by a circuit running through line L-1 through the contacts 113 of relay 100, a line 114, the back contacts 116 of a relay 115, and a line 117 leading through the coil of solenoid 112 to line L-2. The relay 115, which corresponds to relay "543" of Case C, is energized simultaneously with the starting of printer motor 110 through the switch 111 and the lines 118 and 119. Closing of relay 115 immediately breaks the circuit through its contacts 116 to solenoid 112 and causes the latter to open, but by this time the switch 111 is under the control of the printing mechanism and is held closed mechanically until the printing cycle is completed, as indicated diagrammatically by the cam 109' and as described in the above Robertson Patent No. 2,056,486, and therefore the relay 115 will remain energized until the printing cycle is completed.

Closing of relay 115 also completes an energizing circuit for relay 120, which corresponds to relay "560" of Case C. This circuit includes certain portions of the register mechanism of the printer which are indicated diagrammatically at 122 and includes the scanner 300 of Case C which is driven by the printer motor 110. The scanner 300 traverses the series of 0 to 9 contacts connected with the several switches which store weight and price as described in Case B, two of these switches being indicated fragmentarily at V and W. The 0 to 9 contacts of these switches are in turn connected through wiper contacts with the series of solenoids 285 of Case C which control setting of the respective printing wheels 26; two of the ten solenoids 285 are shown and each includes a pair of back contacts 290.

The energizing circuit for the relay 115 runs through contacts 113 of relay 100, the line 114, the contacts 121 of relay 115, parallel connections through each of the solenoid contacts 290, and the line 123. Closing of relay 115 also closes the relay 103 through the contacts 125 of relay 115 and line 125 as shown, and relay 103 immediately locks itself in through its contacts 126 and the line 127 to switch 80.

The circuit conditions established up to this point hold during operation of the printer register mechanism to set the several printing wheels 26 of the printer by operation of the scanner 300 as described in Case C. During this step in the cycle, all of the solenoids 285 are energized, thereby breaking the energizing circuit for the relay 120, and closing its back contacts 130. Then when relay 100 is deenergized upon opening of switch 107 by operation of cam 109, the operating circuit for the motor 50 will be completed through the back contacts 131 of relay 100 and the contacts 132 of relay 115. The motor 50 is accordingly then energized to drive the ticket feed rolls 44 and 45, and it remains energized until the relay 115 is deenergized as a result of the opening of switch 111 upon completion of the printing cycle.

The momentum of motor 50 is sufficient to complete ejection of the ticket even after relay 115 has deenergized and opened its contacts 132, and the ticket is accordingly delivered to the delivery station of the ticket handling mechanism in the position shown in FIG. 5. At this point, a new cycle of the printer cannot begin, since the switch 80 remains closed to lock in the relay 103, and therefore relay 100 cannot be reenergized because the back contacts 102 of relay 103 remain open. Then as soon as the operator withdraws the delivered ticket as described, the accompanied opening of switch 80 breaks the holding circuit for relay 103 so that this relay is able to deenergize and thus to reclose its back contacts 102 in preparation for the next cycle of relay 100 after switch 80 is reclosed.

This circuit arrangement therefore makes it impossible for the printer to operate until after the previously printed ticket has been withdrawn from the delivery station of the ticket handling mechanism, thus preventing accumulation of tickets at the delivery station and possible application of the wrong ticket to a weighed article. Provision is also made by the invention for preventing accidental use of a defective ticket resulting from an error in the operation of the printer. In the normal cycle of the printer as described above, opening of the several solenoid contacts 290 will cause the relay 120 to deenergize ahead of relay 100. If, however, there should be an error in the operation of the printer which prevents one or more of the solenoids 285 from being energized, relay 120 will remain closed and will not open ahead of relay 100. Furthermore, after relay 100 opens, relay 120 will remain energized through a circuit running through its contacts 133, a line 134, the manual reset switch 135 and the back contacts 136 of relay 100. The back contacts 130 of relay 120 therefore remain open so that the ejector motor 50 is prevented from operating.

This error condition is corrected by closing of the reset switch 135, which corresponds to switch 580 in Case C, and when it is closed, it breaks the self-locking circuit for relay 120 and thus causes this switch to open. At the same time, the printer cycle is completed by issuing the defective ticket, which the ticket handling mechanism will eject, but since the operator was forced to operate switch 135 manually to correct for the error, by depression of the switch operating button 137 on the front of the printer, it was positively called to his attention that this ticket was defective and must not be used.

Figure 12:
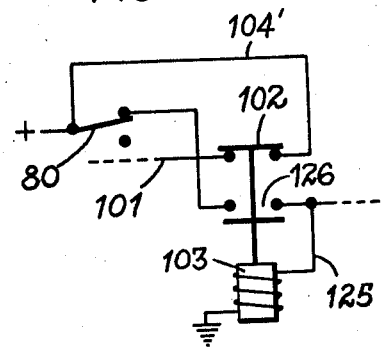
FIG. 12 is a fragmentary view illustrating a modification of the wiring diagram of FIG. 11.

FIG. 12 shows a variation of a portion of the circuits of FIG. 11 which may be used if it is desired to be able to start the next operation of the printer as soon as switch 80 is opened instead of waiting until it has been reclosed. The difference is that the line 104' connects to the positive side of the switch 80 to provide a continuous positive connection for one of the back contacts 102 of relay 100. Normal operation with this circuit arrangement is the same as described in connection with FIG. 11, and switch 80 must be opened at the end of the cycle to permit relay 103 to deenergize for a new printing cycle and then reclosed to permit relay 100 to close. However, with the circuit of FIG. 12, as soon as switch 80 is opened, relay 103 will deenergize to close its back contacts 102 and provide a positive connection for reenergizing of relay 100 through line 104' to permit immediate restarting of the printing cycle. This arrangement also facilitates repeat operation of the printer to print a plurality of identical tickets by means of the repeat switch described in Case C which has the effect of reclosing relay 100 after relay 115 opens to cause repeat operation of the printer so long as switch 80 is held open.

Figure 9:
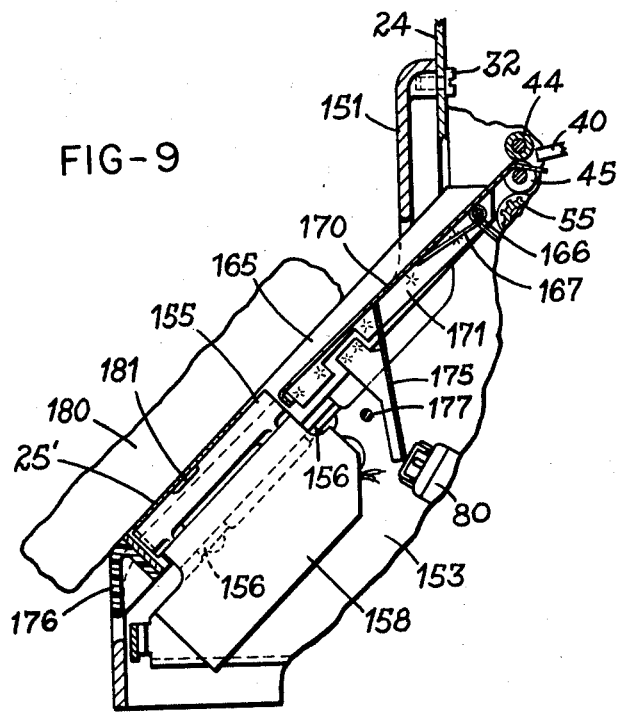
FIG. 9 is a view similar to FIG. 8 showing the operated positions of the parts.

FIGS. 7–9 illustrate a form of ticket handling mechanism in accordance with the invention for use with tickets provided on the backs thereof with a heat activatable adhesive coating for application as a label to the outside of a wrapped package. This unit therefore incorporates a heating element 150 for activating the adhesive coating on the tickets, but many of the other parts in FIGS. 7–9 are shown as identical with the corresponding parts in FIGS. 1–6 and carry the same reference characters. The housing 151 in FIGS. 7–9 is also quite similar to housing 31 and is similarly secured to the printer casing, and the side plates 153 and 154 form a frame within housing 151 which supports the other working parts of the device.

The heating element 150 is carried by a plate 155 of aluminum or other metal having good heat conducting properties which is mounted on tab portions 156 of the side plates 153 and 154 by insulating blocks 157 and suitable screws. The element 150 is inserted in a bore in a depending portion 158 of plate 155, and it is shown in FIG. 11 as connected between the lines L–1 and L–2 and also as provided with an adjustable thermostat control 160 which has an operating knob 161 on one side of housing 151 as shown in FIG. 7. The major portion of the front of housing 151 is open, and a handle 165 of generally U-shape lies in this opening surrounding the plate 155 and is pivoted to the frame at its upper end by a rod 166. A torsion spring 167 normally biases handle 165 in clockwise direction as viewed in FIG. 8.

A chute 170 similar in function to the chute 60 is secured to the inside of handle 165 by flanges 171 spot welded to the handle. The chute 170 is flat except for its upper end which projects between the feed roll 44 and shaft 46, and chute 170 is shown as provided with slots 172 to reduce its surface area and also to provide ventilating openings for heat rising from the heater 150. Similar ventilating openings 173 may be provided adjacent the heater in the side plates 153 and 154. The handle 165 also carries a bracket 175 which corresponds in function to the finger 85 for operating the switch 80 as shown, and since the lower end of handle 165 is close to heater 150, it is provided with an insulator 176 of suitable plastic or like material. A screw or pin 177 projects from the frame for contact with bracket 175 to establish an upper limit position for handle 165 under the biasing force of spring 167.

The operation of this form of the invention is generally similar to that previously described in connection with FIGS. 1–6 and 11. FIG. 8 shows the normal position of the parts, and when motor 50 is operated as previously described, the ejected ticket 25' will slide face down along the chute 170 and across the plate 155, which thus forms a continuation of the chute. This movement of the ticket will be arrested by contact with the inner end of handle 165, which thereby defines a stop comparable in function to the stop 70. Since the plate 155 is hot, the adhesive coating on the upper surface of the ticket will be activated through the body of the ticket, and the operator then need merely press the package against handle 165 to depress it against spring 167 until the package engages and adheres to the tacky surface of the ticket as indicated by the package 180 in FIG. 9. In order to prevent possible smearing of the freshly printed portion of the ticket, the upper surface of plate 155 is provided with a shallow groove 181 which coincides with the designations of weight, price and value on ticket 25 as shown in FIG. 2.

The sequence of operations already described in connection with FIG. 11 applies equally to the form of the device shown in FIGS. 7 and 9, the heating element being simply connected in parallel between lines L–1 and L–2. The function of the switch 80 is the same in both forms of the device, and it is similarly actuated when the operator depresses handle 165, by the bracket 175 which depends from the handle. However, with this form of the invention, it may be necessary to hold the package and the ticket on the heater for a substantial interval as compared with the form of FIGS. 3–5, as for example to insure adhesion in the labeling of packages of frozen foods, and this requires the switch 80 to be held open during such interval. Therefore, the wiring arrangement of FIG. 12 should preferably not be used since it would permit re-cycling of the printer to begin immediately upon opening of switch 80 and might therefore cause delivery of one or more additional tickets while the package is still being held at the delivery station.

It should be noted that both of the ticket handling devices of the invention may readily be used interchangeably without modification of any of the other parts of the system. This result is facilitated by the provision of a terminal block 185 or other connector carried by the inner end of the frame of each unit which provides for simple interconnection of either unit by a complementary terminal member 186 with suitable connecting lines to the printer circuits for the electrical parts carried by the individual ticket handling units. In addition, provision is made for operation of the printer with neither of the ticket handling devices in use, by means of an auxiliary terminal block 187 mounted on a part of the frame of the printer for connection with the member 186 to complete the printer circuits which would otherwise be left open by disconnection of members 185 and 186. For example, this result is accomplished by completing a circuit from line 101 to the positive side of switch 80 which thus bypasses switch 80 and the contacts 102 of relay 103 and thereby prevents relay 103 from blocking operation of the printer.

Provision is also made for physically preventing installation of either ticket handling device without properly connecting it to the printer. The terminal block 187 is mounted in such position within the printer housing, as shown in FIG. 8, that when the member 186 is connected thereto, the member 186 will lie in the path of insertion of the side plate 33 or 153 into the printer housing. In other words, neither ticket handling device can be inserted in the printer housing until the member 186 has been disconnected from the terminal block 187, and this in turn should remind the operator of the necessity of connecting member 186 with block 185.

It will accordingly be seen that this invention offers important practical advantages of speed and convenience in prepackaging operations. Thus when the packages are of the type wherein the ticket is wrapped with the packaged commodity, the only manual action required for the operator is first to place the package on the scale platter for the short interval of time necessary to determine its weight and to supply this weight factor to the computer and printer as described in the other above identified applications. As soon as this part of the cycle is completed, which may be signaled by a light 190 on the front of the scale in Case A, and before the printing cycle has even started, the operator can remove the weighed package from the platter and replace it with the next package to be weighed. The complete cycle including printing may require as little as only two or three seconds, and therefore by the time the operator has completed this exchange of packages on the platter, the ticket should have been issued and delivered to the delivery station. The operator therefore need only release the ticket by depressing lever 75 as described above, either by pressing the package against this lever or by actuating the lever manually.

The use of the invention with tickets having an adhesive coating as described in connection with FIGS. 7–9 is if anything even simpler. The step of weighing is the same, and by the time the packages have been exchanged on the platter, the ticket will normally have been delivered to the heated delivery station for activation of its adhesive coating. All that remains is for the operator to press the package down on this activated coating in order to complete the weighing and labeling operation. It will also be clear that with both types of ticket and handling unit, ample provision has been made by the invention for protection against error from either mechanical or human failure. Thus the invention offers outstanding advantages of accuracy as well as speed and convenience.

This application is a division of our application Serial No. 561,336, filed January 25, 1956, now Patent No. 2,948,466. Reference is also made to our application Serial No. 320,771, filed November 1, 1963, as a division of the present application.

While the method and form of apparatus herein described constitute preferred embodiments of the invention, it is to be understood that the invention is not limited to this precise method and form of apparatus, and that changes may be made therein without departing from the scope of the invention which is defined in the appended claims.

*Index of Copending Applications*

| Case | Name | Serial No. | Filing Date | Patent No. |
|------|------|-----------|-------------|-----------|
| A | Allen | 376,136 | August 24, 1953 | 2,948,523 |
| B | Allen | 436,218 | June 11, 1954 | 2,948,464 |
| C | Allen | 548,148 | November 21, 1955 | 2,948,465 |

What is claimed is:

1. In a system for weighing articles and producing a printed record thereof, the combination of a weighing mechanism, a computer for computing the value of an article weighed by said weighing mechanism, a printer including means for printing and issuing a ticket identifying the weight and value of an article weighed by said weighing mechanism, means electrically interconnecting said weighing mechanism with said computer and printer to cause said computing and printing operations thereof in response to the weighing operation of said weighing mechanism on each successive said article, means connected with said printer for receiving each successive ticket issued by said printer and including means responsive to completion of the operation of said printer for delivering each said ticket to a delivery station, means effective at a predetermined point in the operation of said printer and said delivering means for blocking subsequent operation of said printer, means adjacent said delivery station for actuation by the operator in conjunction with the withdrawal of said ticket from said delivery station to release said blocking means for subsequent operation of said printer, means for sensing improper operation of said printer which would result in the printing of a defective ticket, and means actuated by said sensing means for preventing operation of said delivering means until said improper operation of said printer has been corrected.

2. In a system for weighing articles and producing a printed record thereof, the combination of a weighing mechanism, a computer for computing the value of an article weighed by said weighing mechanism, a printer including means for printing and issuing a ticket identifying the weight and value of an article weighed by said weighing mechanism, means electrically interconnecting said weighing mechanism with said computer and printer to cause said computing and printing operations thereof in response to the weighing operation of said weighing mechanism on each successive said article, means connected with said printer for receiving each successive ticket issued by said printer and including means responsive to completion of the operation of said printer for delivering each said ticket to a delivery station, means for sensing improper operation of said printer which would result in printing of a defective ticket, means actuated by said sensing means for preventing operation of said delivering means and further operation of said computer, reset means for correcting said improper operation of said printer and causing delivery of said defective ticket by said delivering means, said reset means requiring manual operation by the operator to indicate to the operator that the ticket resulting from said improper operation of said printer is defective, means effective at a predetermined point in the operation of said printer and said delivering means for blocking subsequent operation of said printer, and means adjacent said delivery station for actuation by the operator in conjunction with the withdrawal of said defective ticket to release said blocking means for subsequent operation of said printer.

3. In a system for weighing articles and producing a printed record thereof, the combination of a weighing mechanism, a computer for computing the value of an article weighed by said weighing mechanism, a printer including means for printing and issuing a ticket identifying the weight and value of an article weighed by said weighing mechanism, means electrically interconnecting said weighing mechanism with said computer and printer to cause said computing and printing operations thereof in response to the weighing operation of said weighing mechanism on each successive said article, means including a housing connected with said printer for receiving each successive ticket issued by said printer, a retractable stop on said housing defining a delivery station for said tickets, means in said housing responsive to completion of the operation of said printer for feeding each said issued ticket to said delivery station, electrical means for sensing improper operation of said printer which would result in printing of a defective ticket, means actuated by said sensing means for preventing operation of said feeding means and further operation of said computer, reset means for correcting said improper operation of said printer and causing delivery of said defective ticket by said delivering means, said reset means requiring manual operation by the operator to indicate to the operator that the ticket resulting from said improper operation of said printer is defective, means effective at a predetermined point in the operation of said printer and said delivering means blocking subsequent operation of said printer until said defective ticket has been removed from said delivery station, and means responsive to retraction of said stop for releasing said blocking means.

References Cited in the file of this patent

UNITED STATES PATENTS

| | | |
|---|---|---|
| 2,860,867 | Allen | Nov. 18, 1958 |
| 2,931,639 | Lauler | Apr. 5, 1960 |
| 2,948,466 | Allen et al. | Aug. 9, 1960 |
| 2,952,296 | Kofoid | Sept. 13, 1960 |